(12) United States Patent
Malatesha et al.

(10) Patent No.: US 10,541,892 B2
(45) Date of Patent: Jan. 21, 2020

(54) SYSTEM AND METHOD FOR MONITORING, SENSING AND ANALYTICS OF COLLABORATION DEVICES

(71) Applicants: Rathnakara Malatesha, Sunnyvale, CA (US); Charchit Arora, Sunnyvale, CA (US); Lana Wong, Belleville, NJ (US); Hiroshi Kitada, Tuckahoe, NY (US)

(72) Inventors: Rathnakara Malatesha, Sunnyvale, CA (US); Charchit Arora, Sunnyvale, CA (US); Lana Wong, Belleville, NJ (US); Hiroshi Kitada, Tuckahoe, NY (US)

(73) Assignee: RICOH COMPANY, LTD., Tokyo (JP)

( * ) Notice: Subject to any disclaimer, the term of this patent is extended or adjusted under 35 U.S.C. 154(b) by 229 days.

(21) Appl. No.: 14/994,511

(22) Filed: Jan. 13, 2016

(65) Prior Publication Data

US 2017/0201433 A1    Jul. 13, 2017

(51) Int. Cl.
*H04L 12/26* (2006.01)
*H04L 29/06* (2006.01)
*H04L 12/24* (2006.01)

(52) U.S. Cl.
CPC ............ *H04L 43/045* (2013.01); *H04L 41/22* (2013.01); *H04L 65/403* (2013.01)

(58) Field of Classification Search
CPC ... H04L 41/082; H04L 41/0806; H04L 67/10; H04L 67/025; H04L 63/10; G06F 8/65; G06F 8/665
See application file for complete search history.

(56) References Cited

U.S. PATENT DOCUMENTS

| | | | |
|---|---|---|---|
| 2014/0051432 A1* | 2/2014 | Gupta | G06F 21/57 455/425 |
| 2016/0094421 A1* | 3/2016 | Bali | H04L 43/04 709/223 |
| 2016/0294614 A1* | 10/2016 | Searle | H04L 41/082 |
| 2017/0147928 A1* | 5/2017 | Vijayendra et al. | G06N 5/04 |

* cited by examiner

*Primary Examiner* — Philip J Chea
*Assistant Examiner* — Mohammed Ahmed
(74) *Attorney, Agent, or Firm* — Hickman Palermo Becker Bingham LLP; Edward A. Becker

(57) ABSTRACT

Systems and methods are provided herein for sensing, monitoring, and analyzing electronic meeting devices. A data management system is configured to: receive event data that describes a current state of an electronic meeting device from the electronic meeting device that is capable of supporting an electronic meeting having an Internet of Things (IoT) daemon executing thereon, wherein the IoT daemon is configured to generate the event data; perform one or more processes on the event data resulting in processed event data, wherein the one or more processes comprise conversion of the event data from a first format to a second format, compression of the event data, encryption of the event data, and associating a retention policy with the event data; send the processed event data to a data collection system that is configured to provide an analysis of the event data and data analysis tool that is configured to generate an alert associated with the electronic meeting device.

16 Claims, 4 Drawing Sheets

SYSTEM AND METHOD FOR MONITORING, SENSING AND ANALYTICS OF COLLABORATION DEVICES

FIELD

This invention relates generally to networking, and more specifically, to an approach for electronic meeting devices to provide system updates to an analytics system.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Electronic meeting devices used for videoconferencing or web conferencing, such as interactive white boards, video conferencing systems, and projectors, typically have limited user interfaces for accessing system data. The system data is used to maintain the electronic meeting devices, diagnose issues with the electronic meeting devices, and perform repairs to the electronic meeting devices when needed. The system data helps to improve the device's health, lifetime and availabilities by proactively taking maintenance activities on these devices. The electronic meeting devices may be remote from, and inaccessible to, system administrators who are responsible for ensuring that the electronic meeting devices are operating correctly.

Based on the foregoing, there is a need for an approach for managing electronic meeting devices that does not suffer from limitations of prior approaches. There is a particular need for an approach for managing electronic meeting devices that reduces the likelihood of an electronic meeting devices being down. There is a further need for an approach for managing electronic meeting devices that is more user-friendly than conventional approaches. There is also a need for an approach for managing electronic meeting devices that provides a useful mechanism for remotely monitoring and repairing electronic meeting devices.

SUMMARY

An embodiment comprises an apparatus that supports one or more processes comprising: a data management system configured to: receive event data that describes a current state of an electronic meeting device from the electronic meeting device that is capable of supporting an electronic meeting having an Internet of Things (IoT) daemon executing thereon, wherein the IoT daemon is configured to generate the event data; perform one or more processes on the event data resulting in processed event data, wherein the one or more processes comprise conversion of the event data from a first format to a second format, compression of the event data, encryption of the event data, and associating a retention policy with the event data; send the processed event data to a data collection system that is configured to provide an analysis of the event data and data analysis tool that is configured to generate an alert associated with the electronic meeting device.

Another embodiment comprises a non-transitory computer-readable medium having instructions stored thereon, the instructions, when executed by one or more processors cause: receiving event data that describes a current state of an electronic meeting device from the electronic meeting device that is capable of supporting an electronic meeting having an Internet of Things (IoT) daemon executing thereon, wherein the IoT daemon is configured to generate the event data; performing one or more processes on the event data resulting in processed event data, wherein the one or more processes comprise conversion of the event data from a first format to a second format, compression of the event data, encryption of the event data, and associating a retention policy with the event data; sending the processed event data to a data collection system that is configured to provide an analysis of the event data and data analysis tool that is configured to generate an alert associated with the electronic meeting device.

A further embodiment comprises a method comprising: receiving event data that describes a current state of an electronic meeting device from the electronic meeting device that is capable of supporting an electronic meeting having an Internet of Things (IoT) daemon executing thereon, wherein the IoT daemon is configured to generate the event data; performing one or more processes on the event data resulting in processed event data, wherein the one or more processes comprise conversion of the event data from a first format to a second format, compression of the event data, encryption of the event data, and associating a retention policy with the event data; sending the processed event data to a data collection system that is configured to provide an analysis of the event data and data analysis tool that is configured to generate an alert associated with the electronic meeting device.

BRIEF DESCRIPTION OF THE DRAWINGS

In the figures of the accompanying drawings like reference numerals refer to similar elements.

DETAILED DESCRIPTION

Figure 1:
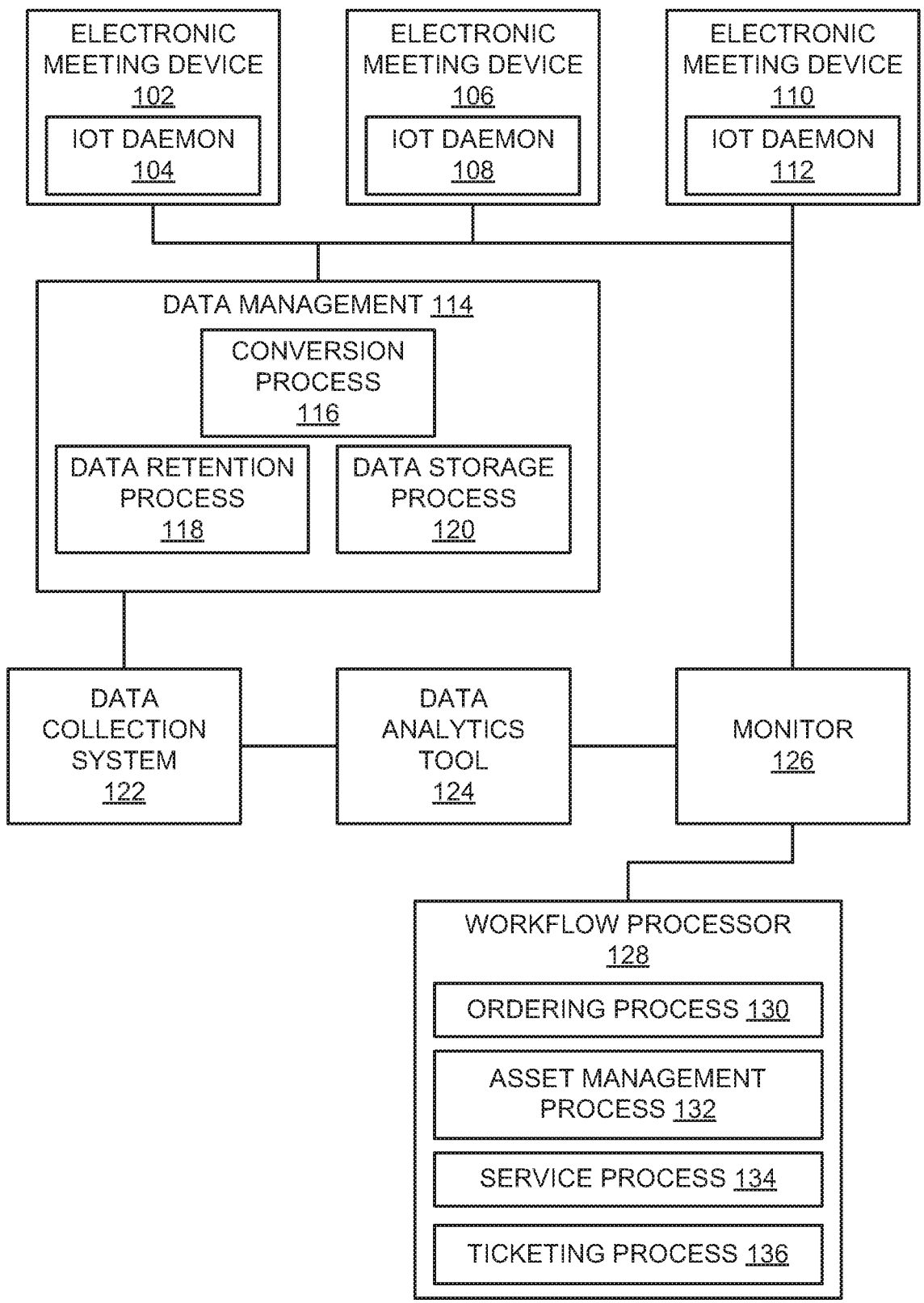
FIG. 1 is a block diagram that depicts an architecture for monitoring, sensing and analyzing data obtained from an IoT daemon according to an embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various embodiments are described hereinafter in the following sections:

I. OVERVIEW
II. MONITORING, SENSING, AND ANALYTICS ARCHITECTURE
III. PUSH METHODS FOR MONITORING COLLABORATION DEVICES
IV. PULL METHODS FOR MONITORING COLLABORATION DEVICES
V. IMPLEMENTATION MECHANISMS

I. Overview

An approach is provided for remote monitoring, sensing, and analytics of networked collaboration devices, also referred to as "electronic meeting devices". Collaboration devices are electronic, networked devices having a specialized user interface and are capable of supporting electronic meetings having participants at more than one geographical location. Collaboration devices include, for example, interactive whiteboards, projectors, cameras, telephone and video conferencing devices, and the like. The specialized user interfaces of the collaboration devices may preclude the collaboration devices from issuing status messages or warnings to users who are responsible for the upkeep and maintenance of these devices. As such, from the point of view of the meeting participants, these devices may become seemingly spontaneously inoperable for unknown reasons.

An Internet of Things (IoT) daemon installed on each of the collaboration devices is configured to detect or obtain event data about the collaboration devices including status messages and warnings describing an issue or potential issue affecting the operation of the collaboration device. The IoT daemon is configured to send the event data to a data management system that readies it for a third party data collection system and data analytics tool. The event data may be reformatted, compressed, or otherwise modified. The third party data collection system and data analytics tool process the data using advanced processing techniques including using artificial intelligence techniques like neural networks. The data analytics tool provides an alert generated based on the event data to a monitor. This alert can be used by a workflow processor to initiate an action, such as repairing or replacing the collaboration device.

Embodiments provide numerous advantages over other existing systems. For example, the disclosed systems and methods provide a way to remotely monitor, maintain, repair, or replace collaboration devices. Further, the disclosed systems and methods allow a remote administrator to diagnose and provide technical support for the collaboration devices from a single console or system. In some embodiments, the system and methods described herein allow for prediction of potential issues before the issues can be identified using conventional means.

II. Monitoring, Sensing, and Analytics Architecture

FIG. 1 is a block diagram that depicts an architecture for monitoring, sensing and analyzing data obtained from an IoT daemon according to an embodiment. The monitoring, sensing, analytics architecture is implemented across networked computers having programmed instructions stored in memory transforming the computers from general purpose computers to special purpose computers. The instructions may be programmed into software or hardwired using integrated circuits. The architecture is provided as an example architecture for the purposes of discussion. Some components within the architecture may be combined or further delineated among various devices. The architecture may include one or more third party devices or components that are in electronic communication with one another.

Electronic meeting devices 102, 106, and 110 are geographically distributed across one or more locations. The electronic meeting devices 102, 106, and 110 are special purpose devices used in electronic meetings, such as teleconferences or video conferences. Examples of electronic meeting devices comprise, but are not limited to, interactive whiteboards, projectors, cameras, and the like. The electronic meeting devices 102, 106, and 110 may have limited user interfaces for accessing system status information or to provide warnings to user of potential issues requiring attention from an administrator. Further, the electronic meeting devices 102, 106, and 110 may not be configured to provide some warnings, to detect particular issues, to sense particular data, to collect data, or to share the data over a network. The electronic meeting devices may comprise a microprocessor configured to execute instructions stored in memory.

Each of the electronic meeting devices 102, 106, and 110, respectively host IoT daemons 104, 108, and 112. The IoT daemons 104, 108, and 112 are configured to sense, collect, and share event data that describes events occurring within the electronic meeting devices 102, 106, and 110. The event data may be collected using sensors or processes embedded within the electronic meeting devices 102, 106, and 110 or by determining a status of the electronic meeting device. The event data may be collected periodically or in response to a triggering event such as disk full, meeting started, or the like. The data collection period may be hourly, daily, weekly, or monthly. The event data may be collected by the IoT daemon 104, 108, or 112 and stored as part of an electronic file such as a JavaScript Object Notation (JSON) file, HyperText Markup Language (HTML) file, text (.txt) file, Simple Object Access Protocol (SOAP) file, or Extensible Markup Language (XML) file. The data store could also be relational databases such as MySQL, Oracle or Non-Relational databases such as Mongo, Cassandra depending on the requirement.

Examples of event data that may be recorded by the IoT daemon depend on the electronic meeting device 102, 106, or 110 on which the IoT daemon resides. The IoT daemon installed on an electronic meeting device may be programmed to generate event data that is specific to the event meeting device. For example, an IoT daemon hosted by an interactive whiteboard may have meeting event data comprising meeting started, meeting ended, user joined meeting, user left meeting, audio dropped, video dropped, file opened, file saved, and recording saved; software event data comprising software installed, software uninstalled, software crashed, and logs full; system event data comprising system up, system down, system health, low disk space, low memory, firewall open, firewall closed, no anti-virus software installed, user logged in, user logged out, user created, and user deleted; and connection event data comprising connection up, connection down, and connection below threshold. For example, an IoT daemon hosted by a video conferencing communication system may have meeting event data comprising meeting started, meeting ended, user joined meeting, user left meeting, audio dropped, and video dropped; software event data comprising software installed, software uninstalled, software crashed, and logs full; system event data comprising system up, system down, system health, user logged in, user logged out, user created, and user deleted; and connection event data comprising connection up, connection down, audio connection below threshold, video connection below threshold, low upstream speed, and low downstream speed. For example, an IoT daemon hosted by a projector may have meeting event data comprising projector on, projector off, audio dropped, and video dropped; software event data comprising operating system supported and languages supported; system event data comprising powered on, powered off, projector health, high noise, and high power consumption; and connection event data comprising connection up, connection down, low resolution, interface connected, and interface disconnected.

The event data, when generated, is populated into an event model that comprises a plurality of data fields such as, but not limited to, electronic meeting device IP address, electronic meeting device name, date, and time. Some types of events may be associated with additional fields that are conditionally included in the event data. For example, event data collected for a "system up" event for an interactive whiteboard may further include resolution, operating system supported, logged in users, GPS Location (Latitude/Longitude), CPU and memory configurations, and connected interfaces. Event data collected for a "meeting started" event may include IP address of host and remote systems, moderator, date and time, time zone, conference room, and physical address. Event data collected for a "User Joined Meeting" event may include user name, user/employee ID, email, device (e.g., if a user is logged in from a mobile device such as a tablet computer or smartphone), location. Event data collected for an "Audio/Video Dropped" event may include resolution at the time of drop, upstream and downstream network speed at the time of drop, and error codes. Event data collected for a "Projector Health" event may include name, model, type of projector, resolution, temperature, GPS Location, and noise level.

The IoT daemons 104, 108, and 112 are configured to communicate via a communications link to data management 114. The communications link may be implemented by any medium or mechanism that provides for the exchange of data between the IoT daemon and data management 114. Examples of communications link include, without limitation, a network such as a Local Area Network (LAN), Wide Area Network (WAN), Ethernet or the Internet, or one or more terrestrial, satellite or wireless links. IoT daemons may support various protocols (such as HTTP, MQTT, and Wi-Fi) to facilitate communication between various kinds of devices (e.g., a whiteboard may support HTTP whereas a projector may support only MQTT). Data management 114 is configured to perform a plurality of operations on the event data before transmitting it to a data collection system 122.

Data management 114 comprises a conversion process 116. The conversion process 116, when performed by data management 114, operates to convert the event data from one file format to another file format that is readable by the data collection system 122. In some embodiments, the conversion process may format the data from a given file format to a JSON electronic file or some other universally accepted format. The conversion process 116 may add or remove data from the file obtained from the IoT daemon 104, 108, or 112 during the conversion process.

Data management 114 further comprises a data retention process 118 that, when performed, applies a data retention policy to the event data. The data retention policy may be assigned according one or more heuristics based on one or more attributes of the event data, such as the origin of the event data, an event indicated by the event data, data type of the event data, criticality of the event data, sensitivity of the event data, or confidentiality of the event data. Different policies may be applied to different event data, based upon the attributes of the event data. The data retention policy may indicate that the event data be accessible to the data collection system 122 for a specified period of time, until a condition is met, or indefinitely. The data retention policy may also specify other data retention functions to be performed, such as encryption to protect sensitive data.

Data management 114 comprises a data storage process 120 that, when performed, stores the event data for transmission to the data collection system 122. The event data may be, for example, encrypted, compressed, or otherwise modified. For example, the event data may be encrypted such that the data collection system 122 can decrypt the event data. The encryption may include an expiration of the data, such that the data may no longer be decrypted after the expiration. The data may be compressed into, for example, a Zip file. In some embodiments, the data storage process 120 may assign a password to the event data such that the event data is not accessible until the password is provided by a system or administrator.

The data collection system 122 comprises a third party system that collects the event data of the electronic meeting devices 102, 106, and 110, and provides the event data to a third party data analytics tool 124. The event data may be collected periodically or in response to a triggering event. The data collection system 122 may comprise, for example, the IBM BLUEMIX® IoT platform. The data analytics tool 124 may comprise, for example, the IBM WATSON® analytics system. The data analytics tool 124, upon receiving the event data, analyzes the event data using artificial intelligence techniques such as neural networks or predictive analytics. The data analytics tool 124 may generate actions based on analytics, provision to a set of various rules, learn new rules based on knowledge, provision to a set corpus or body of knowledge, and provide predictive analytics and reporting. The data analytics tool 124 may predict events affecting the electronic meeting devices 102, 106, and 110 such as device failure or malfunction; disk or memory full; service or warranty notification; virus or malware infection; occurrence of a cyber-attack or Denial of Service (DOS) attack; CPU memory, or temperature thresholds exceeded; unauthorized access of the electronic meeting device; a security or information security violation; or occurrence of a data breach. The data analytics tool 124 generates and sends an alert describing its one or more predictions for the electronic meeting devices 102, 106, and 110 to a monitor 126. The alert may include one or more data fields indicating, for example, the predicted event, identification of the electronic meeting device, and a data and time of the alert.

The monitor 126 comprises a computing device associated with an administrator that provides a graphical user interface (GUI) that displays, on a display of the monitor 126, the alerts received from the data analytics tool 124. The GUI provided by the monitor 126 may display reporting, analytics, and visualizations of the electronic meeting devices 102, 106, and 110; control and send commands to the electronic meeting devices 102, 106, and 110; and send alerts to a workflow processor 128. The monitor 126 may generate and send a message to the administrator in response to the alert in the form of an email or short message service (SMS) message.

A workflow processor 128 is configured to trigger actions to that result in a change in the electronic meeting devices 102, 106, and 110 in response to the alerts. The workflow processor 128 comprises an ordering process 130 that generates an order for a replacement part or electronic meeting device in response to the alert. An asset management process 132 causes an electronic meeting device to be added or removed. A service process 134 causes services to be ordered for an electronic meeting device. A ticketing process 136 causes a ticket to be generated to address the alert. The ticket may be sent to an internal or external service provider.

III. Push Methods for Monitoring Collaboration Devices

Figure 2:
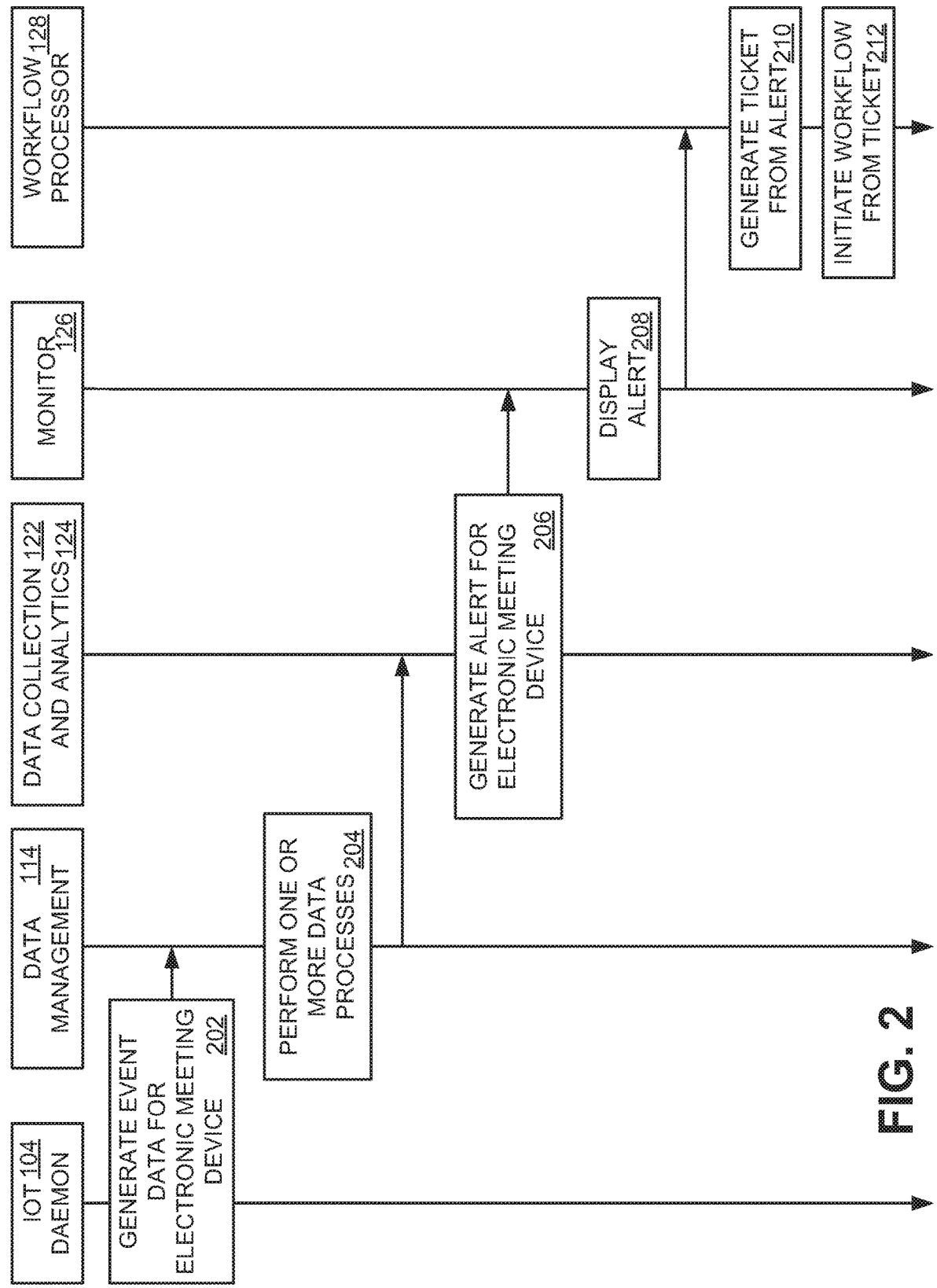
FIG. 2 is a flowchart depicting an example method of monitoring, sensing and analyzing data pushed by an IoT daemon.

FIG. 2 is a flowchart depicting an example method of monitoring, sensing and analyzing data pushed by the IoT daemon 104. The method 104 uses a push mechanism, where the IoT daemon 104 generates the event data absent a request for the event data from the monitor 126. The push mechanism allows for event data to be collected automatically, without human intervention on a periodic basis or when triggered by occurrence of a triggering event. The push mechanism may allow more event data to be collected than a pull mechanism.

In an operation 202, the IoT daemon 104 generates event data for electronic meeting device 102, on which it resides. The IoT daemon 104 may generate the event data periodically or in response to a triggering event. The IoT daemon 104 may include data identifying the electronic meeting device 102, embedded sensor or process data, a type of the event data, a criticality of the event data, a sensitivity of the event data, and a confidentiality of the event data in the event data. The IoT daemon sends the event data to data management 114.

In an operation 204, data management 114 performs one or more data processes on the event data. Data management 114 may reformat, encrypt, or compress the event data. In some embodiments, data management 114 may assign a type of the event data, a criticality of the event data, a sensitivity of the event data, and/or a confidentiality of the event data to the event data. Data management may further determine and assign an expiration to the event data. Data management 114 then sends the event data to data collection 122 which, in turn, sends the event data to the data analytics tool 124.

In an operation 206, the data analytics tool 124 generates an alert for the electronic meeting device 102 from the event data. The alert may be a prediction relating to the operation of the electronic meeting device 102. The data analytics tool 124 sends the alert to the monitor 126.

In an operation 208, the monitor 126 displays the alert in a GUI via a display. The alert may be a message, such as an email message, or be an alert added to a visualization of the electronic meeting device 102. The monitor 126 sends the alert to the workflow processor 128. In an operation 210, the workflow processor 128 may generate a ticket based on the alert. In an operation 212, the workflow processor 128 initiates a workflow process from the ticket. The workflow process may cause a replacement part or device to be ordered, may add or remove the electronic meeting device 102 from the architecture of FIG. 1, or may cause a further ticket or work order to be generated. For example, the ticket or work order may indicate that a DOS attack or other data breach has occurred based on factors such as irregular data format, irregular data speed, spike in data, large data packets from normal operation. Data breach may be predicted based on a determination that unauthorized users of the system accessed critical data files. If, for example, a whiteboard has experienced multiple boot failures in last 3 months, then a ticket may indicate that the system has malfunctioned and is to be replaced. If the workflow processor 128 issues multiple service tickets (e.g., multiple temperature up events from projector) in the same category for one month, then it could predict device is not functioning properly. In some instances, based on meeting start/end dates, number of audio/video drops, and user disconnection, meeting productivity and effectiveness may be predicted as Excellent, Good, or Bad.

Although the flow diagram of FIG. 2 depicts a particular set of steps in a particular order, other implementations may use fewer or more steps, in the same or different order, than those depicted in FIG. 2.

IV. Pull Methods for Monitoring Collaboration Devices

Figure 3:
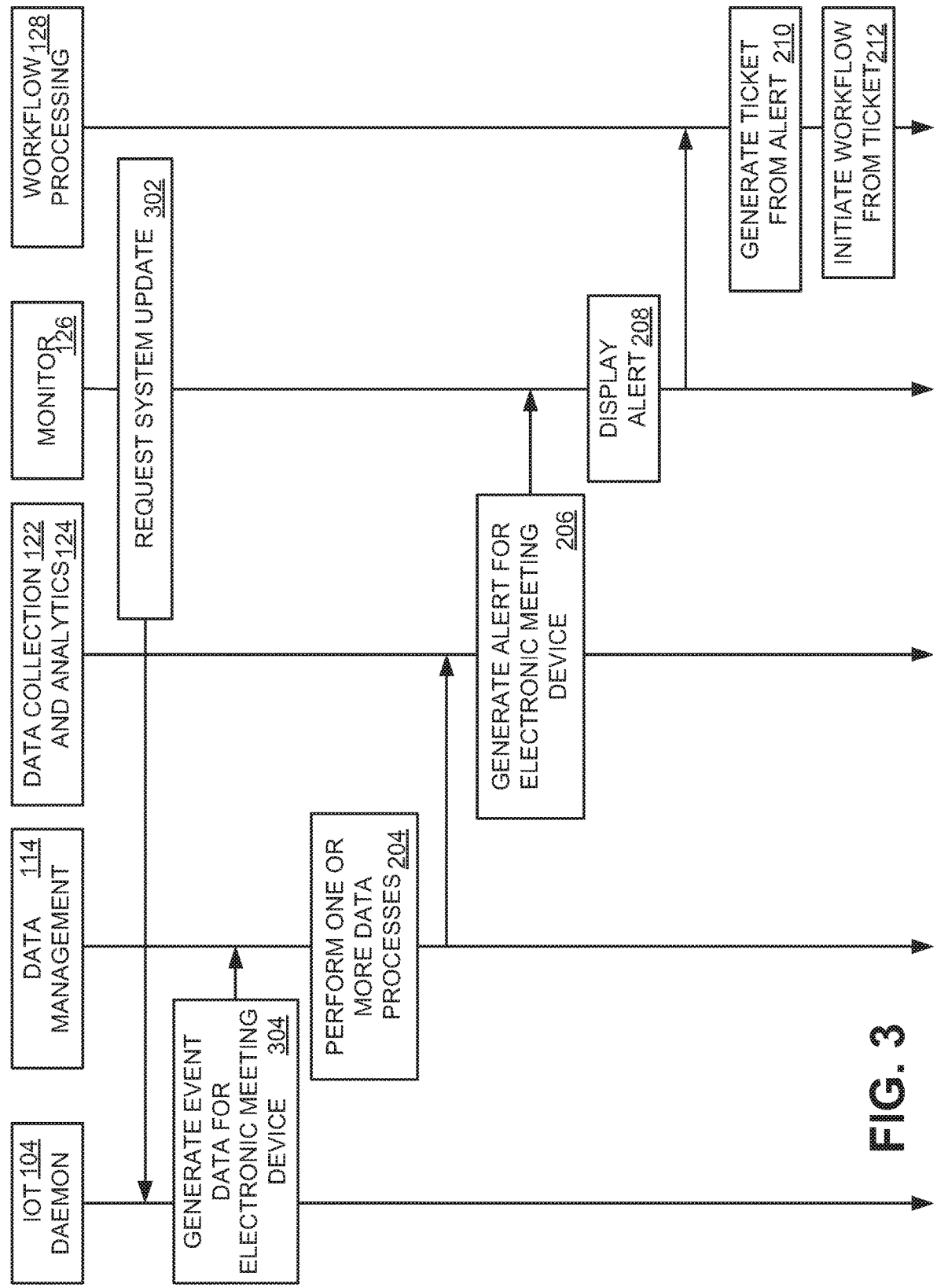
FIG. 3 is a flowchart depicting an example method of monitoring, sensing and analyzing data pulled from the IoT daemon by a monitor.

FIG. 3 is a flowchart depicting an example method of monitoring, sensing and analyzing data pulled from the IoT daemon by a monitor. The monitor 126 may generate a request to pull event data from the IoT daemon 104 on the electronic meeting device 102 automatically, in response to an alert, or when instructed to do so by an administrator. The pull mechanism allows event data to be generated and analyzed on command. In some embodiments, particular event data may be requested. For example, event data indicating a remaining amount of disk space may be requested.

In an operation 302, the monitor generates and sends a request for a system update to the IoT daemon 104. The request may specify particular data, such as data from a particular sensor or processor embedded in the electronic meeting device 102. Alternatively, the request may not specify any event data.

In an operation 304, the IoT daemon 104 generates the event data in response to the request of the operation 302. In some embodiments, the IoT daemon 104 may interrogate one or more embedded sensors or processes. The IoT daemon sends the event data to data management 114. Operations 204, 206, 208, 210, and 212 are then performed to analyze the event data and initiate one or more workflows.

Although flow diagram of FIG. 3 depicts a particular set of steps in a particular order, other implementations may use fewer or more steps, in the same or different order, than those depicted in FIG. 3.

V. Implementation Mechanisms

Managing network device configuration data by functional area as described herein is very user friendly and less prone to errors than prior approaches. Users are informed of their progress on the GUI as each functional area of configuration data is updated and then implemented on a network device. The approach also reduces bandwidth consumption by allowing only data that has been updated to be supplied to a network device. The bulk management features simplify and expedite the editing of existing configuration data and the creation of new configuration data.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
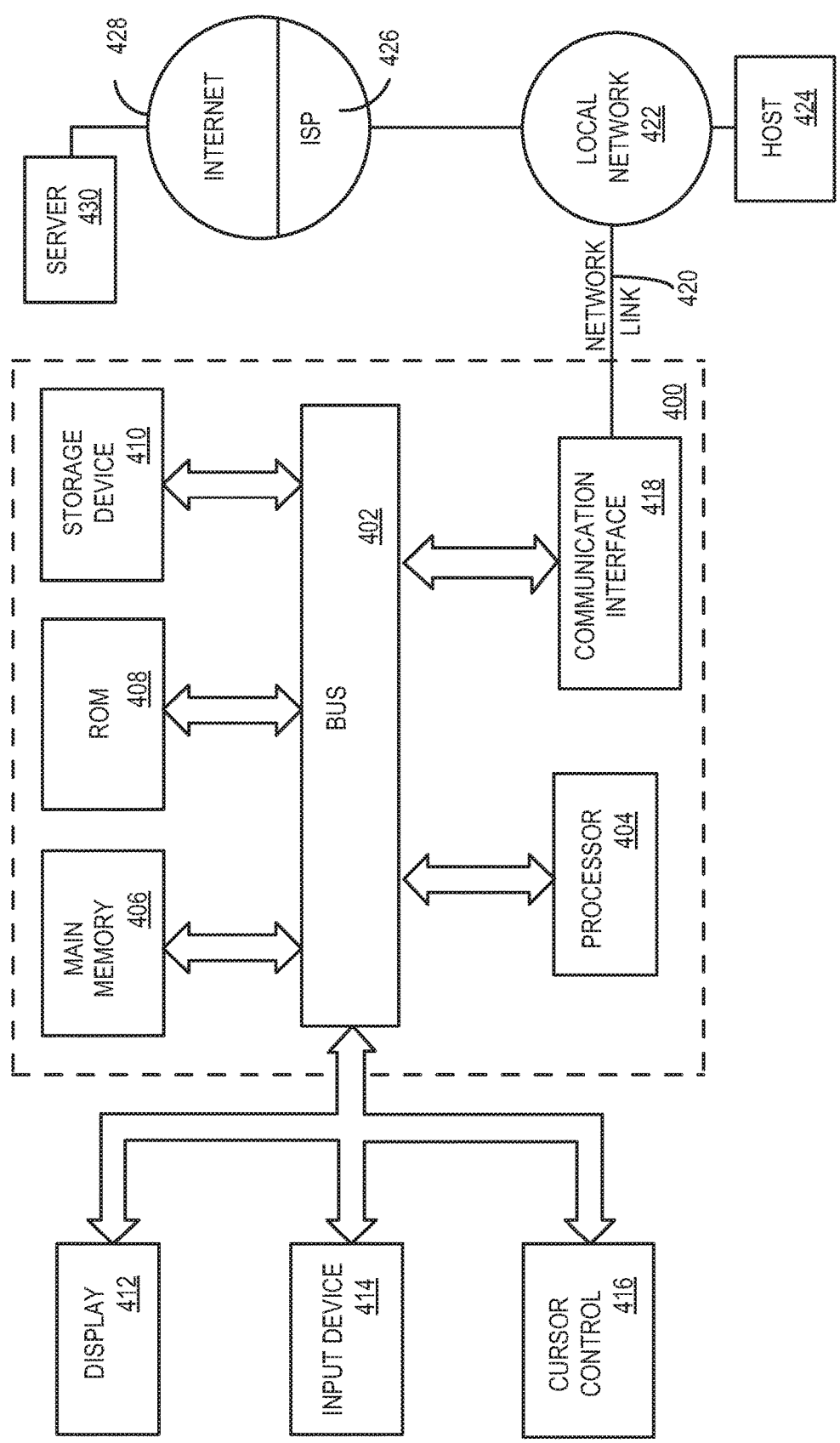
FIG. 4 is a block diagram of a computer system on which embodiments may be implemented.

FIG. 4 is a block diagram that depicts an example computer system 400 upon which embodiments may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. Although bus 402 is illustrated as a single bus, bus 402 may comprise one or more buses. For example, bus 402 may include without limitation a control bus by which processor 404 controls other devices within computer system 400, an address bus by which processor 404 specifies memory locations of instructions for execution, or any other type of bus for transferring data or signals between components of computer system 400.

An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic or computer software which, in combination with the computer system, causes or programs computer system 400 to be a special-purpose machine. According to one embodiment, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any medium that participates in providing data that causes a computer to operate in a specific manner. In an embodiment implemented using computer system 400, various computer-readable media are involved, for example, in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus that supports one or more processes comprising:
    a data management system configured to:
        receive, via one or more computer networks from an electronic meeting device, event data that describes a current state of the electronic meeting device, wherein the electronic meeting device is capable of supporting an electronic meeting having an Internet of Things (IoT) daemon executing thereon, wherein the IoT daemon is configured to generate the event data;
        process the event data to generate processed event data, wherein the processing includes one or more of conversion of the event data from a first format to a second format, compression of the event data, encryption of the event data, or associating a retention policy with the event data;
    cause the processed event data to be transmitted from the apparatus to:
      a data collection system that is separate from the data management system and is configured to analyze the processed event data and generate an analysis of the processed event data, and
      a data analysis tool that is separate from the data management system and configured to generate, based upon the processed event data, an alert for the electronic meeting device, wherein the alert for the electronic meeting device includes a predicted event that has not yet occurred for the electronic meeting device, and
  a monitoring console configured to:
    instruct the IoT daemon of the electronic meeting device to generate the event data, and
    receive from the data analysis tool, the alert associated with the electronic meeting device, and provide a graphical user interface comprising a display of the alert for the electronic meeting device that includes the predicted event for the electronic meeting device that has not yet occurred,
  wherein the retention policy is configured to cause an expiration date to be assigned to the event data and cause the data management system to encrypt the event data such that the event data can no longer be decrypted by the data collection system and the data analysis tool after the expiration date.

2. The apparatus of claim 1 wherein the IoT daemon is configured to send the event data to the monitoring console.

3. The apparatus of claim 1, wherein the data management system is configured to assign the expiration date according to one or more of a data type of the event data, a criticality of the event data, a sensitivity of the event data, or a confidentiality of the event data.

4. The apparatus of claim 1, further comprising:
  a workflow processor to remotely initiate a workflow process that results in a change in the electronic meeting device.

5. The apparatus of claim 4, wherein the initiated workflow process is configured to generate an order for a replacement part for the electronic meeting device.

6. The apparatus of claim 4, wherein the initiated workflow process causes the electronic meeting device to be removed or added.

7. The apparatus of claim 4, wherein the initiated workflow process causes the electronic meeting device to be repaired.

8. The apparatus of claim 4, wherein the initiated workflow process is configured to generate a service ticket.

9. The apparatus of claim 4, wherein the initiated workflow process comprises generating and sending a message with the event data or the alert to the monitoring console.

10. The apparatus of claim 1, wherein the electronic meeting device comprises an interactive whiteboard, a projector, or a camera.

11. The apparatus of claim 1, wherein the event data is generated in response to a malfunctioning of the electronic meeting device.

12. The apparatus of claim 11, wherein the event data indicates that the electronic meeting device is offline, has been added to an electronic meeting, or has been removed from an electronic meeting.

13. The apparatus of claim 11, wherein the event data indicates that the electronic meeting device has limited bandwidth or memory.

14. The apparatus of claim 11, wherein the event data indicates that the electronic meeting device has been subjected to a cyber attack.

15. A non-transitory computer-readable medium having instructions stored thereon, the instructions, when executed by one or more processors cause:
  receiving, by a data management system via one or more computer networks from an electronic meeting device, event data that describes a current state of the electronic meeting device, wherein the electronic meeting device is capable of supporting an electronic meeting having an Internet of Things (IoT) daemon executing thereon, wherein the IoT daemon is configured to generate the event data;
  processing the event data to generate processed event data, wherein the processing includes one or more of conversion of the event data from a first format to a second format, compression of the event data, encryption of the event data, or associating a retention policy with the event data;
  transmitting the processed event data from the apparatus to:
    a data collection system that is separate from the data management system and is configured to analyze the processed event data and generate an analysis of the processed event data, and
    a data analysis tool that is separate from the data management system and configured to generate, based upon the processed event data, an alert for the electronic meeting device, wherein the alert for the electronic meeting device includes a predicted event that has not yet occurred for the electronic meeting device,
  instructing, by a monitoring console, the IoT daemon of the electronic meeting device to generate the event data, and
  receiving, by the monitoring console, from the data analysis tool, the alert associated with the electronic meeting device, and provide a graphical user interface comprising a display of the alert for the electronic meeting device that includes the predicted event that has not yet occurred for the electronic meeting device,
  wherein the retention policy is configured to cause an expiration date to be assigned to the event data and cause the data management system to encrypt the event data such that the event data can no longer be decrypted by the data collection system and the data analysis tool after the expiration date.

16. A method comprising:
  receiving, by a data management system via one or more computer networks from an electronic meeting device, event data that describes a current state of the electronic meeting device, wherein the electronic meeting device is capable of supporting an electronic meeting having an Internet of Things (IoT) daemon executing thereon, wherein the IoT daemon is configured to generate the event data;
  processing the event data to generate processed event data, wherein the processing includes one or more of conversion of the event data from a first format to a second format, compression of the event data, encryption of the event data, or associating a retention policy with the event data;

transmitting the processed event data to:
  a data collection system that is separate from the data management system and is configured to analyze the processed event data and generate an analysis of the processed event data, and
  a data analysis tool that is separate from the data management system and configured to generate, based upon the processed event data, an alert for the electronic meeting device, wherein the alert for the electronic meeting device includes a predicted event that has not yet occurred for the electronic meeting device,
instructing, by a monitoring console, the IoT daemon of the electronic meeting device to generate the event data, and
receiving, by the monitoring console, from the data analysis tool, the alert associated with the electronic meeting device, and provide a graphical user interface comprising a display of the alert for the electronic meeting device that includes the predicted event that has not yet occurred for the electronic meeting device,
wherein the retention policy is configured to cause an expiration date to be assigned to the event data and cause the data management system to encrypt the event data such that the event data can no longer be decrypted by the data collection system and the data analysis tool after the expiration date.

\* \* \* \* \*